United States Patent [19]
Stoll et al.

[11] Patent Number: 6,126,736
[45] Date of Patent: Oct. 3, 2000

[54] PIGMENT STABILIZATION

[75] Inventors: Klaus Stoll, Binzen; Andreas Thuermer, Weil am Rhein, both of Germany; Gilbert Ligner, Mulhouse, France; Joseph Reni Webster, Charlotte, N.C.

[73] Assignee: Clariant Finance (BVI) Limited, Tortola, Virgin Islands (Br.)

[21] Appl. No.: 09/011,867

[22] PCT Filed: Aug. 16, 1996

[86] PCT No.: PCT/EP96/03623

§ 371 Date: Feb. 17, 1998

§ 102(e) Date: Feb. 17, 1998

[87] PCT Pub. No.: WO97/07160

PCT Pub. Date: Feb. 27, 1997

Related U.S. Application Data

[60] Provisional application No. 60/002,531, May 18, 1995.

[51] Int. Cl.$^7$ .............................. C08K 5/3435; C08J 3/22
[52] U.S. Cl. ......................... 106/506; 106/498; 546/186; 546/190; 546/191
[58] Field of Search .................................. 106/506, 498; 546/186, 190, 191

[56] References Cited

FOREIGN PATENT DOCUMENTS 3412227  10/1984  Germany .

*Primary Examiner*—Anthony Green
*Attorney, Agent, or Firm*—Susan S. Jackson

[57] ABSTRACT

The invention relates to a process of using certain piperidine compounds of formula I

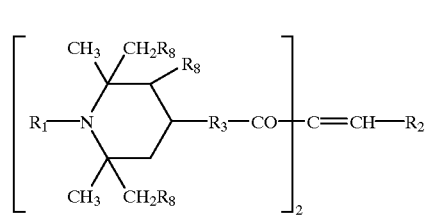

in which $R_1$ is hydrogen, hydroxyl, lower alkyl, lower alkoxy or acyl, $R_2$ is a substituted or unsubstituted mono- or bicyclic radical which is aromatic in type, $R_3$ is oxygen, —NH— or —N($C_{1-4}$-alkyl)— and $R_8$ independently at each occurrence is hydrogen or methyl for stabilizing natural or synthetic, organic or inorganic pigments or pigment mixtures in natural or synthetic, polymeric or prepolymeric substrates against the adverse effects of heat and/or light on the light fastness and color stability, respectively, especially against alterations in shade or light-induced bleaching. The invention also relates to a masterbatch composition.

17 Claims, No Drawings

PIGMENT STABILIZATION

This application claims the benefit of U.S. Provisional Application No. 60/2531 filed Aug. 18, 1995.

The invention relates to the use of certain piperidine compounds of formula I below for stabilizing natural or synthetic, organic or inorganic pigments or pigment mixtures in natural or synthetic, polymeric or prepolymeric substrates against the adverse effects of heat and/or light on the light fastness and colour stability, respectively, especially against alterations in shade or light-induced bleaching. The invention also relates to a masterbatch composition comprising at least one piperidine compound of formula I below, at least one organic or inorganic pigment and a natural or synthetic material which is identical or compatible with the natural or synthetic, polymeric or prepolymeric substrate to be pigmented. The invention additionally relates to a method of stabilizing organic or inorganic pigments or pigment mixtures in natural or synthetic, polymeric or prepolymeric substrates against the adverse effects of heat and/or light on the light fastness and colour stability, respectively, especially against alterations in shade or light-induced bleaching, by adding an amount, effective for stabilization, of at least one piperidine compound of formula I below, as such or in the form of a masterbatch composition, to the pigment or pigment mixture to be stabilized or to the natural or synthetic, polymeric or prepolymeric substrate comprising the pigment or pigment mixture.

Pigments are colorants which are insoluble or of extremely low solubility. Colorants generally comprise groups of atoms known as chromophoric groups, which induce colour in molecules, and auxochromic groups, which although not themselves colour-inducing reinforce the colour intensity and depth of colour. These groups of atoms can be damaged by energy supplied in the form of heat or light. Therefore, one speaks of the colour fastness of pigments. For example, in a coloured finished article which in the course of its use is exposed to the effect of heat and/or of natural or artificial light, especially its UV component, the established shade is altered or its intensity, i.e. depth of colour, decreases.

The object of the invention, therefore, is to improve the light fastness and colour intensity of pigments and the service life of the pigmented end products.

This object is achieved by the technical teaching of Patent claims 1 and 9 and, respectively, 11.

It has surprisingly been found that the presence of certain piperidine compounds of formula I below substantially improves the colour fastness of pigments or pigment mixtures.

It is known that compounds of the HALS type (HALS= hindered amine light stabilizer) react as free-radical scavengers and are therefore used to stabilize polymeric substrates. These commercially available HALS compounds, however, do not have a specific light-stabilizing action on pigments.

The invention accordingly provides for the use of piperidine compounds of the formula I

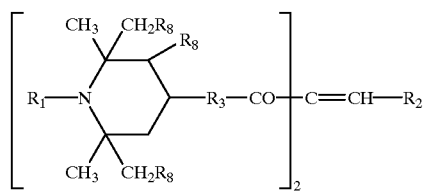

in which

- $R_1$ is hydrogen, hydroxyl, lower alkyl, lower alkoxy or acyl,
- $R_2$ is a substituted or unsubstituted mono- or bicyclic radical which is aromatic in type,
- $R_3$ is oxygen, —NH— or —N($C_{1-4}$-alkyl)— and
- $R_8$ independently at each occurrence is hydrogen or methyl, for stabilizing natural or synthetic, organic or inorganic pigments and/or mixtures thereof in natural or synthetic, polymeric or prepolymeric substrates against the adverse effects of heat and/or light on the light fastness and colour stability, respectively, especially against alterations in shade or light-induced bleaching.

By lower alkyl are meant preferably radicals having 1 to 8, especially 1 or 2, carbon atoms; suitable acyl radicals are preferably the radicals of formic, acetic or propionic acid.

All radicals $R_1$ are preferably hydrogen, hydroxyl, methyl or $C_{1-8}$-alkoxy, especially methyl.

Among mono- or bicyclic radicals $R_2$ which are aromatic in type suitable examples are benzene, naphthalene and nitrogen- and/or sulphur-containing five- or six-membered rings with or without a fused-on benzene ring, which carry sterically hindered hydroxyl, for example, as a substituent (3,5-di-tert-butyl-4-hydroxyphenyl), or a thienyl radical. Six-membered aromatic rings are preferred. Examples of substituents which may be present on these rings are hydroxyl, lower alkyl or alkoxy, preferably methyl, tert-butyl, methoxy, ethoxy, hydroxyl and one or two groups of the formula

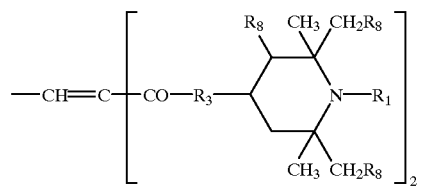

All radicals $R_8$ are preferably hydrogen.

The following compounds of the formulae Ia and Ib are particularly suitable for the light stabilization of pigments.

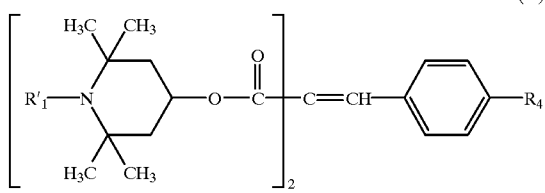

(Ia)

in which
R'$_1$=H, CH$_3$, OC$_8$H$_{17}$(n), C(O)CH$_3$
R$_4$=H, OCH$_3$ and

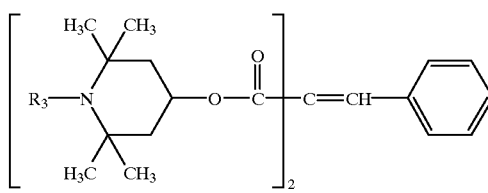

(Ib)

in which
R$_3$=H, CH$_3$.

The substrate is selected in particular from the group consisting of plastics and paints and other coatings.

In the substrates it is possible to employ, in addition to piperidine compounds of the formula I, further, commercially customary additives, such as, for example, phenolic antioxidants, secondary aromatic amines, thioethers, phosphorus compounds, biocides, metal passivators, other HALS compounds, UV absorbers, antistatic agents and the like, and also various coatings auxiliaries or inert fillers, for example talc, chalk, glass, barytes, etc.

End products whose pigmentation is stabilized in accordance with the invention are notable for a substantially extended service life relative to prior art articles.

The invention likewise provides a masterbatch composition which comprises at least one piperidine compound of the formula I and also, if chosen, at least one inorganic or organic pigment and a natural or synthetic carrier material which is identical or compatible with the natural or synthetic, polymeric or prepolymeric substrate to be pigmented.

Piperidine compounds of the formula I, or a masterbatch composition comprising the piperidine compound, can be added to the pigmentation substrate before, during or after the addition of a pigment or pigment mixture.

The concentration of the piperidine compounds of the formula I is at least 0.01%, preferably from 0.05 to 3.0% by weight, with particular preference from 0.1 to 1.7% by weight of the weight of the overall mixture which is to be processed to the end product, including the polymeric or prepolymeric substrate, and the weight ratio to the overall pigmentation is from at least 1:100 to 100:1, preferably from 1:50 to 50:1 and, with particular preference, from 1:20 to 20:1. In accordance with the customary methods the pigmentation can be added in pure form, as so-called bulk pigments; in predispersed form, as concentrates, masterbatches and the like; or in combination with further additives to the plastics, paints or other coatings.

In the examples which follow and which illustrate the invention the parts and percentages are by weight and the temperatures are in degrees Celsius.

EXAMPLES

I. Materials employed

The following piperidine compound of the formula (1) where R$_1$=CH$_3$, R$_2$=p-methoxyphenyl, R$_3$=oxygen and R$_8$=H, referred to below for short as Stabilizer 1, is employed:

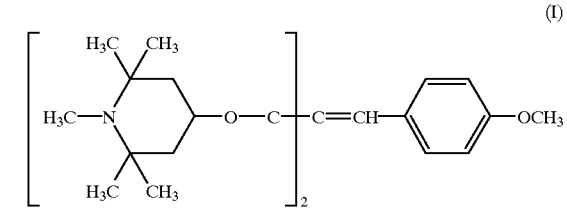

(I)

The following commercial pigments and pigment mixtures are employed:

Pigmentation 1.1: 1 part of Graphtol Echtgelb 3 GP [=C.I. Pigment Yellow 155], an azopigment from Clariant, in a blend with 2 parts of titanium dioxide (rutile pigment) [=C.I. Pigment White 6]

Pigmentation 1.2: This colorant is obtainable as a masterbatch (MB) from Clariant under the designation Sanylen Blau 39-93 [C.I. Pigment Blue 29]. It is a polysulphide-containing sodium-aluminium silicate.

Pigmentation 1.3: This colorant is obtainable as a masterbatch (MB) from Clariant under the designation Sanylen Grau AU 604/S5 and consists of:
71.7% Sanylen Blau 39-93 [C.I. Pigment Blue 29] as MB60 in LDPE
14.2% Sanylen Schwarz EMA (carbon black) [C.I. Pigment Black 7] as MB30 in LDPE
10.2% Sanylen Weiss 39-93 (rutile) [C.I. Pigment White 6] as MB60 in LDPE
3.8% Sanylen Braun 3RLM (Fe$_2$O$_3$) [C.I. Pigment Red 101] as MB50 in LDPE The following polymers are employed as carrier materials for testing the light stability of the pigmentations:
Polymer 2.1: Polypropylene homopolymer
melt index=4.8 g/10 min (230°/2.16 kg)
base stabilization:
0.1% calcium stearate
0.05% Sandostab® P-EPQ (Clariant)
0.05% Irganox® 1010 (Ciba-Geigy)

Polymer 2.2: Polyethylene homopolymer (HDPE, Ziegler type)
melt index=2.0 g/10 min (190°/2.16 kg)
base stabilization:
  0.08% calcium stearate
  0.15% Irganox® B-215 (Ciba-Geigy
Polymer 2.3: EPDM-modified polypropylene block copolymer
melt index=10.0 g/10 min (230°/2.16 kg)
base stabilization:
  0.08% calcium stearate
  0.1% Sandostab® P-EPQ
  0.08% Irganox® 1010
where

| Sandostab ® P-EPQ | is a processing stabilizer from Clariant based on a sterically hindered phosphonite |
| Irganox ® 1010 | is an antioxidant from Ciba-Geigy based on a sterically hindered phenol, and |
| Irganox ® B-225 | is an antioxidant from Ciba-Geigy based on Irganox ® 1010 and Irgafos ® 168, a phosphite processing stabilizer. |

The following HALS compounds of the prior art are employed in the Comparative Examples:

HALS-1: Chimassorb® 944 FL, an oligomeric HALS compound from Ciba-Geigy

HALS-2: Sanduvor® 3944, an oligomeric, high molecular mass HALS type from Clariant HALS-3: Tinuvin® 770, a low molecular mass HALS compound from Ciba-Geigy HALS-4: Uvasorb® HA-88, an oligomeric, high molecular mass HALS compound from 3V France S.A.

II. Preparing the test specimens

Processing takes place by thorough mixing of pulverulent polymer with the likewise pulverulent bulk pigment or, where pigments are used in masterbatch form, by mixing polymer granules and masterbatch granules and then homogenizing the mixture in the melt by extrusion under the customary conditions for processing the respective polymers. Incorporation of the novel piperidine compounds or the HALS compounds used in comparison experiments takes place likewise by adding them to the exclusively pulverulent constituents or, if masterbatches are used, by adding them in likewise granulated from as MB20, i.e. as a masterbatch containing 20% of the piperidine or HALS compound in the same carrier polymer as in the end use. The pigmented starting material obtained in this way, after cooling and strand pelletization, is then processed by conventional injection moulding to give the actual test sheets, with a thickness of 1–3 mm, which are then employed for measuring the light fastness of the pigmentation.

III. Test methods

Exposure or accelerated weathering of the pigmented test sheets takes place under the following conditions:

3.1: Q-U-V Accelerated Weathering Tester from Q-Panel Company, carried out at a wavelength of 340 mm in accordance with standards ASTM G 53 and ASTM D 5208/91

3.2: Atlas Weather-O-meter Ci 65 from Atlas, in accordance with the standard SAE-J 1885

3.3: NATAC 200 test (natural accelerated test) carried out in Bandol, France
Note: 3000 hours of NATAC 200 correspond to one year of outdoor weathering under natural conditions (according to the French standard NF-T 54–405)

Whereas condition 3.1 is a widespread laboratory method of accelerated exposure, conditions 3.2 and 3.3, especially 3.2, are used by numerous vehicle manufacturers and their suppliers in order to carry out corresponding tests, especially of pigmented substrates.

Comparative measurements of the colour fastnesses of the various samples are measured after the respective exposure times indicated by subjecting the test sheets to calorimetric measurement by determining the so-called delta E and delta C values which in simplified terms express the deviation of the overall perceived colour (shade, intensity) and, resepctively, the colour saturation in relation to the unexposed comparison samples. Colour fastness is good when both delta E and delta C after exposure are close to zero. The further the test result from zero, the more evident the colour deviations will be to the eye. The abovementioned parameters are components of the so-called CIELAB system (see JSDC, September 1976, pp. 337–338); further details on colorimetry are described in the standards ISO 7724/3 and DIN 6174.

IV. Novel and comparative examples

Example 1

1.5 mm injection moulded sheets are produced using 0.3% of pigmentation 1.1 and polymer 2.1 and the abovementioned stabilizers, and immediately after production they are characterized by colorimetry.

|  | Control | 0.25% HALS 1 | 0.5% HALS 1 | 0.25% Stabilizer 1 | 0.5% Stabilizer 1 |
|---|---|---|---|---|---|
| delta C | 0 | −1.6 | −1.8 | 0.2 | −0.2 |
| delta E | 0 | 2.5 | 2.3 | 0.8 | 1.0 |

The delta C and delta E values measured relative to the control sample (without HALS compound) show that following the incorporation of the novel stabilizer 1 there are markedly smaller deviations from the desired shades than in the comparative example using HALS-1.

Example 2

Injection moulded sheets produced in accordance with Example 1 are exposed under the condition 3.1 for a period of 600 hours and then characterized by colorimetry.

|  | Control | 0.25% HALS 1 | 0.5% HALS 1 | 0.25% Stabilizer 1 | 0.5% Stabilizer 1 |
|---|---|---|---|---|---|
| delta C | −1.3 | −1.3 | −1.2 | −0.6 | −0.7 |
| delta E | 1.7 | 2.1 | 1.5 | 1.1 | 1.2 |

Comparison of the test results clearly shows the colour-stabilizing effect of the novel stabilizer 1. Whereas the commercial compound HALS-1 has virtually no effect on the light fastness of the pigmentation, a marked improvement is obtained through the use of the stabilizer 1; in other words, the colour deviation measured relative to the original state, as a consequence of exposure, is substantially reduced, with an effective concentration of 0.25% of the stabilizer 1 being sufficient in the present case. The effect of the stabilizer 1 is manifested in the close-to-zero values of both delta C and delta E.

Example 3

Injection moulded sheets produced in accordance with Example 1 are exposed under the condition 3.2 for a period of 636 hours (time of actual exposure) of intense UV radiation and are then measured calorimetrically.

|  | Control | 0.25% HALS 1 | 0.5% HALS 1 | 0.25% Stabilizer 1 | 0.5% Stabilizer 1 |
|---|---|---|---|---|---|
| delta C | −3.7 | −3.2 | −2.6 | −2.0 | −2.70 |
| delta E | 4.0 | 4.2 | 2.9 | 2.5 | 2.5 |

Once again, comparison shows that the conventional compound HALS-1 produces only a slight improvement in the light fastness of the pigmentation. Only at a higher concentration of 0.5% of HALS-1 is a certain difference observed relative to the control sample (without HALS stabilizer). In contrast it was found that even under these exposure conditions the use of the novel stabilizer 1 achieves markedly improved light fastnesses and colour stabilities of the pigmentation.

Example 4

Using 1.2% of pigmentation 1.2 in the form of a 60% strength concentrate in LDPE (i.e. 2% MB60 masterbatch) incorporated into the polymer 2.2, the light fastness-improving action of the novel stabilizer 1 is tested in comparision to other commercial HALS compounds HALS-2 and HALS-4 on 3 mm injection moulded sheets. The accelerated weathering takes place under the part-natural, part-artificial conditions 3.3 in Bandol, France.

The delta E values indicated in the table, measured relative to the unexposed reference samples, are obtained after 9000 hours of weathering.

|  | 0.15% HALS-4 | 0.15% HALS-2 | 0.15% Stabilizer 1 |
|---|---|---|---|
| delta E | 11.9 | 9.1 | 5.0 |

The stabilizing action of the novel stabilizer 1 is clearly evident in particular after the long exposure time chosen in the present example. The measured colour deviation of the pigmentation is approximately only half that of the conventional samples stabilized with HALS-2 or HALS-4; in other words, the presence of the stabilizer 1 was able to reduce significantly the "bleaching" in coloration which is clearly evident even on visual inspection.

Example 5

Using 2% of pigmentation 1.3 and the polymer 2.3 and the abovementioned stabilizers, 1 mm injection moulded sheets were produced. These sheets are then exposed under condition 3.3 and characterized by colorimetry after 3000 and 4500 hours.

|  | 0.3% HALS-2 + 0.3% HALS-3 | 0.6% HALS-3 | 0.6% Stabilizer 1 |
|---|---|---|---|
| delta E (after 3000 h) | 0.36 | 0.21 | 0.08 |
| delta E (after 4500 h) | 0.68 | 0.59 | 0.45 |

The low molecular mass compound HALS-3, or its combination with the oligomeric, relatively high molecular mass HALS-2 is employed very frequently in the present polymer 2.3 and can be regarded as the prior art to date. Here again, the novel use of the stabilizer 1 in the same concentration achieves a marked increase in the colour stability of the pigmentation used and thus improves the service properties of corresponding, coloured products and/or maintains their original coloration over a longer period of use.

We claim:

1. A process of using piperidine compounds to stabilize organic pigments, inorganic pigments or pigment mixtures in natural or synthetic, polymeric or prepolymeric substrates against the adverse effects of heat and light in order to improve the light fastness and colour stability of pigments and pigment mixtures and to improve the service life of pigmented end products, comprising:

adding an amount, effective for stabilization, of at least one piperidine compound having the following formula:

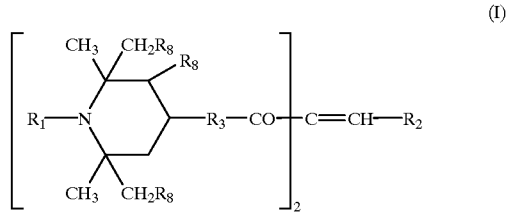

(I)

wherein $R_1$ is $C_{1-8}$ alkyl, $R_2$ is a substituted or unsubstituted mono- or bicyclic aromatic radical, $R_3$ is oxygen, —NH— or —N($C_{1-4}$-alkyl)—, and $R_8$ independently at each occurrence is hydrogen or methyl, to a pigment or a pigment mixture to be stabilized, or to a natural or synthetic, polymeric or prepolymeric substrate, wherein said substrate is comprised of a pigment or pigment mixture, to form an overall mixture with an overall pigmentation.

2. The process according to claim 1, wherein $R_1$ is $C_{1-8}$-alkyl, $R_2$ is a benzene or naphthalene ring, $R_3$ is oxygen, —NH— or —N($C_{1-4}$-alkyl)—

$R_8$ is hydrogen.

3. The process according to claim 2, wherein $R_1$ is a methyl radical.

4. The process according to claim 2, wherein $R_2$ is a p-$C_{1-8}$-alkoxy-substituted benzene ring, a nitrogen- and sulphur-containing five- or six-membered ring with or without a fused-on benzene ring, or a nitrogen- or sulphur-containing five- or six-membered ring with or without a fused-on benzene ring.

5. The process according to claim 1, wherein said piperidine compound has the following formula:

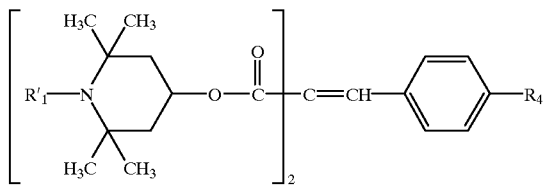
(Ia)

wherein

R′$_1$ is CH$_3$, and

R$_4$ is H or OCH$_3$.

6. The process according to claim 1, wherein said piperidine compound has the following formula:

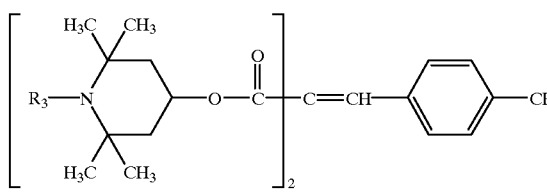
(Ib)

wherein R$_3$ is CH$_3$.

7. The process according to claim 1, wherein said piperidine compound is present in the substrate in an amount of at least 0.01% by weight, based on the weight of the overall mixture.

8. The process according to claim 7, wherein said piperidine compound is present in the substrate in an amount from 0.05 to 3.0% by weight, based on the weight of the overall mixture.

9. The process according to claim 8, wherein said piperidine compound is present in the substrate in an amount from 0.1 to 1.7% by weight, based on the weight of the overall mixture.

10. The process according to claim 1, wherein said substrate is selected from the group consisting of plastics and paints.

11. The process according to claim 1, wherein said substrate further comprises at least one additive selected from the group consisting of antioxidants, antistats, light stabilizers, fillers, reinforcing agents and coatings auxiliaries.

12. A masterbatch composition comprising at least one piperidine compound having the following formula:

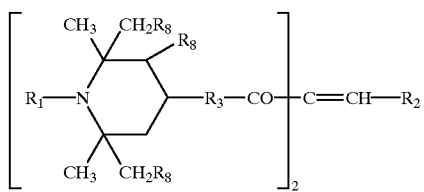
(I)

wherein

R$_1$ is C$_{1-8}$ alkyl,

R$_2$ is a substituted or unsubstituted mono- or bicyclic aromatic radical,

R$_3$ is —NH— or —N(C$_{1-4}$-alkyl)—, and

R$_8$ is independently at each occurrence is hydrogen or methyl, and at least one organic or inorganic pigment and a natural or synthetic carrier material which is an identical material as or a compatible material with a substrate to be pigmented, wherein said substrate is natural, synthetic, polymeric or prepolymeric.

13. A process of using piperidine compounds to stabilize organic pigments, inorganic pigments or pigment mixtures in natural or synthetic, polymeric or prepolymeric substrates against the adverse effects of heat and light in order to improve the light fastness and colour stability of pigments and pigment mixtures, and to improve the service life of pigmented end products, comprising:

adding an amount, effective for stabilization, of at least one piperidine compound having the following formula:

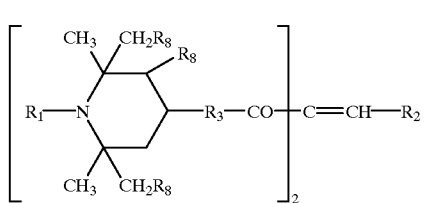
(I)

wherein

R$_1$ is C$_{1-8}$ alkyl,

R$_2$ is a substituted or unsubstituted mono- or bicyclic aromatic radical,

R$_3$ is oxygen, —NH— or—N(C$_{1-4}$-alkyl)—, and

R$_8$ independently at each occurrence is hydrogen or methyl, in the form of a masterbatch to a pigment or a pigment mixture to be stabilized, or to a natural or synthetic, polymeric or prepolymeric substrate, wherein said substrate is comprised of a pigment or pigment mixture, to form an overall mixture with an overall pigmentation.

14. The process according to claim 13, wherein said piperidine compound is present in the substrate in an amount of at least 0.01% by weight, based on the overall mixture.

15. The process according to claim 14, wherein said piperidine compound is present in the substrate in an amount from 0.05 to 3.0% by weight, based on the overall mixture.

16. The process according to claim 15, wherein said piperidine compound is present in the substrate in an amount from 0.1 to 1.7% by weight, based on the overall mixture.

17. The process according to claim 13, wherein said substrate is selected from the group consisting of plastics and paints.

* * * * *